(12) United States Patent
Tsirkin et al.

(10) Patent No.: US 9,836,241 B1
(45) Date of Patent: Dec. 5, 2017

(54) LABEL BASED GUEST MEMORY DEDUPLICATION

(71) Applicant: Red Hat Israel, Ltd., Ra'anana (IL)

(72) Inventors: Michael Tsirkin, Westford, MA (US); Uri Lublin, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 15/251,540

(22) Filed: Aug. 30, 2016

(51) Int. Cl.
*G06F 12/10* (2016.01)
*G06F 3/06* (2006.01)
*G06F 9/455* (2006.01)

(52) U.S. Cl.
CPC .......... *G06F 3/0641* (2013.01); *G06F 3/0608* (2013.01); *G06F 3/0664* (2013.01); *G06F 3/0673* (2013.01); *G06F 9/45533* (2013.01)

(58) Field of Classification Search
CPC ....... G06F 2009/45583; G06F 9/45558; G06F 2212/1044; G06F 9/45533; G06F 12/109; G06F 3/0641; G06F 9/5016; G06F 9/5077; G06F 9/45545; G06F 3/0604; G06F 3/0631; G06F 3/0673; G06F 3/0664; G06F 3/061; G06F 3/0608; G06F 3/0644
See application file for complete search history.

(56) References Cited

U.S. PATENT DOCUMENTS

| | | | |
|---|---|---|---|
| 9,032,181 B2 | 5/2015 | Ahmad et al. | |
| 9,208,031 B2 | 12/2015 | Mace et al. | |
| 9,298,385 B2 | 3/2016 | Baldwin et al. | |
| 2010/0082547 A1* | 4/2010 | Mace | G06F 11/1435 707/648 |
| 2012/0089764 A1 | 4/2012 | Baskakov et al. | |
| 2015/0039849 A1* | 2/2015 | Lewis | G06F 12/109 711/203 |
| 2015/0286414 A1* | 10/2015 | Gordon | G06F 12/1081 711/159 |
| 2016/0110291 A1 | 4/2016 | Gordon et al. | |

OTHER PUBLICATIONS

Rodney Owens, Weichao Wang, "Non-Interactive OS Fingerprinting Through Memory De-Duplication Technique in Virtual Machines", 2011, Department of SIS and CyberDNA Center, University of North Carolina at Charlotte, NC 28223, http://webpages.uncc.edu/wwang22/Research/papers/IPCCC-11-Owens.pdf.

(Continued)

*Primary Examiner* — Hashem Farrokh
(74) *Attorney, Agent, or Firm* — Haynes and Boone, LLP (57) ABSTRACT

Methods, systems, and computer program products are included for deduplicating one or more memory pages. A method of deduplicating one or more memory pages includes receiving, by a hypervisor, a label from a guest running on a virtual machine. The label corresponds to a list of guest memory pages including a first guest memory page allocated to the guest. The method also includes scanning, by the hypervisor, a hypervisor memory for a second memory page that is a duplicate of the first guest memory page and corresponds to the same label as the first guest memory page. The method further includes in response to a determination that the second memory page is stored in the hypervisor memory, deduplicating the first and second memory pages.

20 Claims, 5 Drawing Sheets

(56) References Cited

OTHER PUBLICATIONS

Philipp Kern, "Generalizing Memory Deduplication for Native Applications, Sandboxes and Virtual Machines", Nov. 1, 2012-Apr. 30, 2013, Faculty of computer science, Institute of Operating and Dialogue Systems, System Architecture, karlsruher Institute for Technology, https://os.itec.kit.edu/downloads/da_2013_kern-philipp_memory-deduplikation.pdf.

Yan Niu, Wei Liu, Fei Xiang, Lihong Wang, "Fast Memory Deduplication of Disk Cache Pages in Virtual Environments", Aug. 26-28, 2015, Nat. Comput. Network Emergency Response Tech. Team/Coordination Center of China, Beijing, China, http://ieeexplore.ieee.org/xpl/login.jsp?tp=&arnumber=7310712 &url=http%3A%2F%2Fieeexplore.ieee.org%2Fxpls%2Fabs_all. jsp%3Farnumber%3D7310712.

Fabian Franz, "Using I/O-based Hints to Make Memory-Deduplication Scanners More Efficient", Diploma Thesis, Jul. 29, 2012, Department of Computer Science, KIT—Universität des Landes Baden-Württemberg and nationales Forschungszentrum in der Helmholtz-Gemeinschaft.

\* cited by examiner

LABEL BASED GUEST MEMORY DEDUPLICATION

FIELD OF DISCLOSURE

The present disclosure generally relates to electrical computers and digital data processing, and more particularly to memory management.

BACKGROUND

A virtual machine is software that is executed on hardware to create a virtualization of a physical computer system. Virtual machines may function as self-contained platforms that run their own operating systems and software applications. A host machine may concurrently run one or more virtual machines using a hypervisor. The hypervisor allocates a certain amount of the host machine's resources, such as the host machine's underlying physical processors and memory devices, to each of the virtual machines. This allocation by the hypervisor allows guests of the virtual machines to transparently access the host machine's resources. Guest applications, including guest operating systems, may be executed on the allocated resources of each virtual machine. Local or remote clients may access these guest applications to perform computing tasks. In some instances, virtual machines and guest applications may be implemented to provide cloud computing environments.

Memory of a host machine and virtual machines running on the host machine is typically divided into memory pages. In some host machines, the hypervisor reduces physical memory consumption by using memory deduplication techniques to reduce the amount of memory pages that store the same data. Memory deduplication improves memory utilization by detecting that two (or more) pages in memory are identical and merging the duplicate pair of pages into a single page. In an example, a first memory page may reside in a first virtual machine's memory space, and a second memory page may reside in a second virtual machine's memory space. If the first and second memory pages have the same content, the first memory page may be considered a duplicate of the second memory page and removed. In such an example, a page table entry of the first virtual machine may be modified to point to the second memory page, and the first virtual machine may use the second memory page rather than the first memory page, thus improving the utilization of memory.

Memory deduplication may be performed by the hypervisor scanning memory pages assigned to virtual machines to identify memory pages that store the same content. The hypervisor consolidates memory pages that store the same content into a single memory page, thereby reducing the amount of memory resources used by the virtual machines.

BRIEF SUMMARY

Methods, system, and techniques for deduplicating one or more memory pages are provided.

An example system for deduplicating one or more memory pages includes a hypervisor memory that stores a plurality of memory pages. The system includes an indexing module that receives a label corresponding to a list of guest memory pages and scans, based on the label, the hypervisor memory for a duplicate of a guest memory page specified in the list of guest memory pages. The system further includes a deduplication module that in response to a determination that a scanned memory page in the hypervisor memory is a duplicate of the guest memory page, deduplicates the duplicate memory page and the guest memory page. The label corresponds to the duplicate memory page.

An example method of deduplicating one or more memory pages includes receiving, by a hypervisor, a label from a guest running on a virtual machine. The label corresponds to a list of guest memory pages including a first guest memory page allocated to the guest. The method also includes scanning, by the hypervisor, a hypervisor memory for a second memory page that is a duplicate of the first guest memory page and corresponds to the same label as the first guest memory page. The method further includes in response to a determination that the second memory page is stored in the hypervisor memory, deduplicating the first and second memory pages.

An example machine-readable medium includes a plurality of machine-readable instructions that when executed by one or more processors is adapted to cause the one or more processors to perform a method including: receiving, by a hypervisor, a label from a guest running on a virtual machine, the label corresponding to a list of guest memory pages allocated to the guest, and the list of guest memory pages including a first guest memory page; scanning, by the hypervisor, a hypervisor memory for a second memory page that is a duplicate of the first guest memory page and corresponds to the same label as the first guest memory page; and in response to a determination that the second memory page is stored in the hypervisor memory, deduplicating the first and second memory pages.

Examples of the present disclosure and their advantages are best understood by referring to the detailed description that follows.

DETAILED DESCRIPTION

In the following description, specific details are set forth describing some examples consistent with the present disclosure. It will be apparent, however, to one skilled in the art that some examples may be practiced without some or all of these specific details. The specific examples disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional.

Memory deduplication improves memory utilization by detecting that two (or more) pages in memory have identical content. Two memory pages are identical if the content stored at those pages is the same. If two memory pages are identical, the hypervisor may identify the virtual machines that use those particular memory pages and map the two virtual machines to reference one of those identical memory pages and discard the other memory page. Accordingly, both the first virtual machine's page table and the second virtual machine's page table may store a mapping to the same memory page, which may be referred to as a deduplicated memory page. The hypervisor marks the page table entries of the first and second virtual machines that point to the second memory page as read-only to trigger a page fault and a copy-on-write. If the first virtual machine attempts to modify the deduplicated memory page, the hypervisor provides the first virtual machine with a copy of the deduplicated memory page and updates the mapping in the first virtual machine's page table to reference the copy (rather than to the original deduplicated memory page). The first virtual machine may then be allowed to write to the copy.

Conventional techniques of memory deduplication involve the hypervisor scanning the memory of a first virtual machine and comparing this scanned memory to all memory of a second virtual machine. The hypervisor may accordingly scan a large amount of memory, taking time and resources. In some examples, a hypervisor may store candidate memory pages in a data structure indexed by page content, and identify memory pages in the data structure that are identical. For guests that are allocated a large amount of memory, the scanning process may take a long time, especially as the data structure grows.

Rather than scan the data structure, which may store a large amount of data in hypervisor memory, and compare this scanned memory to the guest memory pages to search for duplicates, it may be advantageous to reduce the amount of memory scanned. In some example, the guest assigns labels to guest memory pages and passes these labels to the hypervisor. Memory pages that are assigned the same label may have one or more commonalities indicating that they may have duplicates. In some examples, the guest initializes a guest memory page, and the guest notifies the hypervisor about the purpose for which the guest memory page is used. In some examples, the guest assigns a label to each guest memory page, and each label indicates the memory page content. In an example, the guest may load a shared library into a range of memory addresses and pass the name of the library as a label along with the range of memory addresses to the hypervisor. The label corresponds to the memory pages stored at the memory address range.

Rather than create one data structure that indexes all the candidate memory pages, the hypervisor may receive one or more labels corresponding to one or more lists of guest memory pages and create a data structure for each distinct label. If the hypervisor receives a label corresponding to a list of guest memory pages, the hypervisor may locate the data structure corresponding to the label and search this data structure for duplicates of guest memory pages specified in the list. Accordingly, the hypervisor may organize and maintain separate data structures per label. In this way, the hypervisor may initiate memory page deduplication by scanning a data structure that stores fewer pages than the conventional data structure and comparing the scanned data structure to guest memory pages allocated to a guest to search for duplicates. Accordingly, the size of the data structure that indexes content is reduced.

This technique may reduce processing costs associated with scanning all memory allocated to virtual machines/all memory in hypervisor memory, and narrow the scan down to those memory pages that most likely have duplicates, and thereby may provide improved speeds. These techniques may be beneficial and advantageous for improving processing efficiency and performance while at the same time improving memory usage. Of course, it is understood that these features and advantages are shared among the various examples herein and that no one feature or advantage is required for any particular example.

Figure 1:
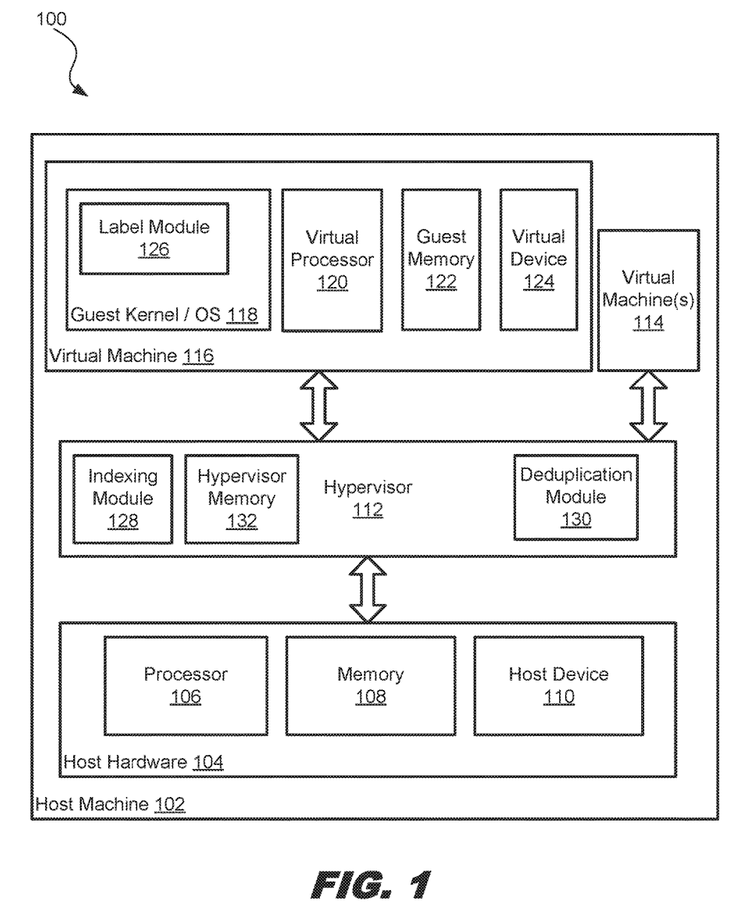
FIG. 1 is a block diagram illustrating a virtualized computing system that initiates memory deduplication based on a label corresponding to memory pages, in accordance with various examples of the present disclosure.

FIG. 1 is a block diagram illustrating a virtualized computing system 100 that initiates memory deduplication based on a label corresponding to memory pages, in accordance with various examples of the present disclosure. The system 100 includes a host machine 102. The host machine 102 may include a personal computer (PC), tablet PC, rack mount computer, cellular telephone, web appliance, server, network router, switch or bridge, or any machine capable of executing a set of instructions (sequential or otherwise) that specify actions to be taken by that machine. Further, while a single host machine is illustrated, the term "machine" shall also be taken to include any collection of machines that individually or jointly execute a set (or multiple sets) of instructions to perform any one or more of the methodologies discussed herein. For example, a collection of machines may be communicatively coupled via one or more network devices and/or transport media.

The host machine 102 includes host hardware 104. Host hardware 104 includes physical elements such as a processor 106, a memory 108, and a host device 110. While one of each of these elements is illustrated for the purposes of simplicity, in some examples more than one or more of these hardware elements may be included. For example, the host hardware 104 may include a plurality of processors as well as various types of memory and host devices.

A "processor" may also be referred to as a "physical processor" or "central processing unit (CPU)" herein. A processor shall refer to a device capable of executing instructions encoding arithmetic, logical, or input/output (I/O) operations. In one illustrative example, a processor may follow the Von Neumann architectural model and may include an arithmetic logic unit (ALU), a control unit, and a plurality of registers. In a further aspect, a processor may be a single core processor that is typically capable of executing one instruction at a time (or process a single pipeline of instructions), or a multi-core processor that may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket).

In the present example, the processor 106 is structured to include one or more general-purpose processing devices such as a microprocessor, central processing unit, and the like. More particularly, the processor 106 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. In some examples, the processor 106 is structured to include one or more special-purpose processing devices such as an application specific integrated circuit (ASIC), a field programmable gate array (FPGA), a digital signal processor (DSP), network processor, and so forth. The processor 106 executes instructions for performing the operations, steps, and actions discussed herein.

"Memory" herein shall refer to volatile or non-volatile memory, such as random access memory (RAM), read-only memory (ROM), electrically erasable ROM (EEPROM), or any other memory capable of storing data. In the present example, the memory 108 is structured to include at least one computer-readable storage medium on which is stored one or more sets of instructions (e.g., software) embodying any one or more of the methodologies or functions described herein. The memory 108 may be structured to include one or more of a read-only memory (ROM), flash memory, dynamic random access memory (DRAM) (such as synchronous DRAM (SDRAM), double data rate (DDR) SDRAM, or Rambus DRAM (RDRAM), and so forth), static memory (e.g., flash memory, static random access memory (SRAM), and so forth), and a data storage device (e.g., a hard disk drive (HDD), solid state drive (SSD), and so forth). Accordingly, any of the operations, steps, and actions of the methods described herein may be implemented using corresponding machine-readable instructions stored on or in a non-transitory computer-readable medium that are executable by the processor 106.

In the present example, the host device 110 is structured to include at least one hardware device, such as a network interface card, wireless adapter card, audio/sound card, graphics card, storage adapter, or other hardware device. In some examples, these hardware devices are coupled to a PCI bus provided by the host hardware 104. In other examples, hardware devices are integrated into a motherboard provided by the host hardware 104. The processor 106, memory 108, and host device 110 hardware elements of the host hardware 104 may be communicatively coupled via one or more buses. The host hardware 104 also may include other hardware elements, such as a video display unit (e.g., a liquid crystal display (LCD) monitor), alphanumeric input device (e.g., a keyboard), cursor control device (e.g., a mouse), signal generation device (e.g., a speaker), and so forth.

The host machine 102 includes a hypervisor 112, which also may be referred to as a virtual machine monitor, virtual machine manager, and/or VMM. The hypervisor 112 may include executable instructions that are stored in the memory 108 and executed by the processor 106 to provide one or more virtual machines (e.g., virtual machine 116 and one or more other virtual machines 114, which may be structured similarly to virtual machine 116).

In some examples, the hypervisor 112 is run on top of a host operating system and host kernel. In other examples, the hypervisor 112 is run directly on host hardware 104 without the use of a host operating system. The hypervisor 112 may also be structured to use or include functions provided by a host operating system and/or host kernel. For example, the kernel may provide kernel modules, such as Kernel Same-Page Merging (KSM), that include functions for scanning memory and merging duplicate memory pages. The hypervisor 112 may use such functions to manage virtual machines, resources provided to virtual machines, and otherwise control operations corresponding to virtual machines. Accordingly, these functions may be considered to be part of the hypervisor. In other examples, functionality for performing deduplication may be included in the hypervisor while being stored in a memory space that is external to a host kernel and/or host operating system.

In the present example, hypervisor 112 is structured to include instructions that are executed to provide one or more virtual machines 114 and a virtual machine 116. The virtual machine(s) 114 may include components similar to those illustrated with respect to virtual machine 116, such as a kernel, operating system, virtual processor, guest memory, virtual device, and so forth.

The hypervisor 112 is structured to provide the virtual machine 116 by virtualizing at least a portion of the host hardware 104. The hypervisor 112 may provide the virtual machine 116 by performing a hardware emulation, full virtualization, paravirtualization, and/or operating system-level virtualization corresponding to the host machine 102. In some examples, the hypervisor 112 is structured to rely upon, use, or include features provided by a kernel and/or operating system running on the host machine 102. In these examples, the hypervisor 112 may call one or more memory deduplication functions that are provided by a host machine kernel that runs underneath the hypervisor 112. Accordingly, the hypervisor 112 is structured to provide the memory deduplication features.

The hypervisor 112 manages system resources, including providing access of guests (e.g., guest applications such as operating systems, kernels, user applications, and so forth) of the virtual machine 116 to the host hardware 104, such as the processor 106, the memory 108, and the host device 110. In the present example, the system resources that are provided to the guests of the virtual machine 116 include a virtual processor 120 that is mapped to the processor 106, the guest memory 122 that is mapped to at least a portion of the memory 108, and a virtual device 124 that corresponds to the host device 110.

The hypervisor 112 is structured to receive one or more labels from one or more guests running on one or more virtual machines. Based on the received labels, the hypervisor 112 is structured to trigger memory deduplication techniques, such as scanning the memory 108 to identify memory pages that store identical data, merging the identified memory pages, referencing the merged memory pages by multiple virtual machines, marking each merged memory page copy-on-write (COW), and in the event that merged memory pages are modified, creating separate copies of the merged memory pages to store any modifications.

In the present example, the virtual machine 116 includes a guest kernel/operating system (OS) 118. The guest kernel/operating system 118 may be structured to include a kernel as well as an operating system that runs on top of the kernel. However, in other examples, the guest kernel/operating system 118 may include a stand-alone kernel that does not have an operating system running on top of the kernel.

The kernel of the virtual machine 116 provides core computing functionality to the virtual machine 116. For example, a kernel manages important tasks of the virtual machine 116, such as allocating memory pages of the guest memory 122 to virtual machine processes and/or threads, communicating I/O to and from the virtual device 124, managing a file system, handling interrupts, scheduling and running processes to execute instructions of computing tasks by the virtual processor 120, providing an interface between devices and software applications, and/or providing other important computing features.

A guest operating system of the virtual machine 116 may run on top of the kernel to provide additional interfaces and functionality on the virtual machine 116 beyond those offered by the kernel. The guest operating system may include, for example, RED HAT ENTERPRISE LINUX, FEDORA, WINDOWS, OS X, IOS, ANDROID, or other operating system. In some examples, the virtual machine 116 may be structured to include a plurality of guest operating systems that run on top of the kernel.

In the present example, the virtual processor 120 includes one or more processors that may be accessed by processes running on the virtual machine 116 to pass instructions to the processor 106 for execution. These instructions may include executable instructions stored on memory pages in the guest memory 122. For example, executable instructions may correspond to instructions of executable (binary) files and/or libraries that are executed to perform actions on the virtual machine 116.

The hypervisor 112 allocates the guest memory 122 to the virtual machine 116. In the present example, the guest memory 122 includes a portion of the memory 108. The guest memory 122 may include one or more ranges of memory pages that are mapped to the memory 108, such that processes running on the virtual machine 116 may access the memory 108 by accessing the guest memory 122. These ranges of memory pages may include one or more consecutive and/or non-consecutive memory ranges. Each range may include one or more memory pages. The mapping between the memory pages of the guest memory 122 and the memory pages of the memory 108 may be provided by one or more page tables of the hypervisor 112 and/or virtual machine 116.

In the present example, the virtual device 124 is a virtual representation of the host device 110. The hypervisor 112 may expose the host device 110 to the virtual machine 116 to allow the virtual machine 116 to create the virtual device 124 that corresponds to the host device 110. Accordingly, the hypervisor 112 and virtual machine 116 may create a virtual device 124 that represents the host device 110. The virtual device 124 may be accessed by the virtual machine 116 and/or guest kernel/operating system 118 to perform 110 operations with respect to the host device 110.

In the present example, the guest kernel/operating system 118 includes a label module 126. In some examples, the label module 126 is provided by a guest operating system. The label module 126 is structured to assign one or more labels to one or more lists of guest memory pages and send the one or more labels to the hypervisor 112. The guest kernel/operating system 118 may send a label to the hypervisor 112 via, for example, a hypercall or shared memory. For example, the label module 126 may store the label in a memory region that is shared between the guest kernel/operating system 118 and the hypervisor 112, and the hypervisor 112 may access the labels by reading them from the shared memory region.

A label that is assigned to a list of guest memory pages corresponds to the list of guest memory pages. In some examples, the label may reside in multiple bytes, and the multiple bytes may occupy consecutive memory addresses. Additionally, the guest kernel/operating system 118 may load a list of guest memory pages into a memory address range and send the memory address range to the hypervisor 112. In some examples, the guest kernel/operating system 118 may assign a multi-byte label per memory address range. In some examples, a label is a global label corresponding to all of a memory of a virtual machine.

It may be advantageous for guests to group guest memory pages that are likely to have duplicates together by marking them with the same label. In some example, a label indicates a content type stored in a list of guest memory pages corresponding to the label. For example, a label may include a library name that is shared between multiple guests and/or virtual machines. In such an example, a guest may determine that a list of guest memory pages stores or is used by the C library, and assigns a label including "C library," which is a standard library for the C programming language, to the list of guest memory pages. In some examples, the guest loads the C library into the list of guest memory pages. In some examples, the C library uses the list of guest memory pages. Multiple guests and/or virtual machines may use the C library. Each virtual machine may store its own copy of the C library or may be allocated memory pages used by the C library. If a first guest assigns a label including "C library" to a first list of guest memory pages and a second guest assigns the same label to a second list of guest memory pages, it may be advantageous to scan and compare the first and second lists of guest memory pages because they have the same label. As will be explained further below, the hypervisor 112 may receive one or more labels, create a data structure for each distinct label, locate the data structure corresponding to a label, and insert memory pages into the data structure corresponding to the same label as the memory pages. In this way, it may be unnecessary for the hypervisor 112 to scan all of the hypervisor memory 132 to look for duplicates.

In another example, the label assigned to a list of guest memory pages includes a version of content stored in the list of guest memory pages. In another example, the label assigned to a list of guest memory pages includes a signature of the content stored in the list of guest memory pages. In another example, the label assigned to a list of guest memory pages indicates a zero page, which is a page storing all zeros.

The label may include a cryptographic key. In some examples, the cryptographic key is assigned per-application (e.g., per virtual machine or per-guest). In some examples, the cryptographic key is assigned per-user. The user of the cryptographic key may prevent information leaks between users and/or applications through deduplication. In an example, two virtual machines belong to the same user, and each guest running on these virtual machines assigns a label including the same cryptographic key to a list of guest memory pages. The hypervisor 112 may organize memory pages in accordance with their assigned labels and cryptographic keys, and deduplicate memory between virtual machines belonging to the same user by checking that the memory pages are assigned the same cryptographic key. If memory pages are assigned a label including different cryptographic keys or one of the labels does not include a cryptographic key, then the hypervisor 112 knows that the two virtual machines on which the particular guests run are unrelated (e.g., they do not belong to the same user). Deduplication between unrelated virtual machines may cause problems because a virtual machine may detect that a memory page has been deduplicated and/or a write to a deduplicated memory page has occurred because the amount of time taken to complete the particular operation was longer than expected. Accordingly, this may cause security vulnerabilities because a virtual machine may guess at the content of memory in an unrelated virtual machine. The hypervisor 112 may limit the number of memory pages being deduplicated by using the cryptographic key. Accordingly, timing attacks to leak information between guests may be reduced or eliminated.

The hypervisor 112 includes a hypervisor memory 132, indexing module 128, and deduplication module 130. The indexing module 128 and the deduplication module 130 may be structured to communicate with each other and the guest kernel/operating system 118 to deduplicate the appropriate memory pages. The indexing module 128 receives one or more labels corresponding to one or more lists of guest memory pages, creates a data structure for each distinct label, and stores the data structures in the hypervisor memory 132. The indexing module 128 receives a label from a guest and locates the data structure corresponding to the label. For each guest memory page specified in the list of guest memory pages, the indexing module 128 searches this data structure corresponding to the label for a duplicate of the respective guest memory page. If the data structure corresponding to the label does not store a duplicate of a guest memory page specified in the list of guest memory pages, the indexing module 128 inserts the guest memory page into the data structure corresponding to the label. In contrast, if the data structure corresponding to the label stores a duplicate of a guest memory page specified in the list of guest memory pages, the deduplication module 130 deduplicates the duplicate memory page and the guest memory page.

Figure 2:
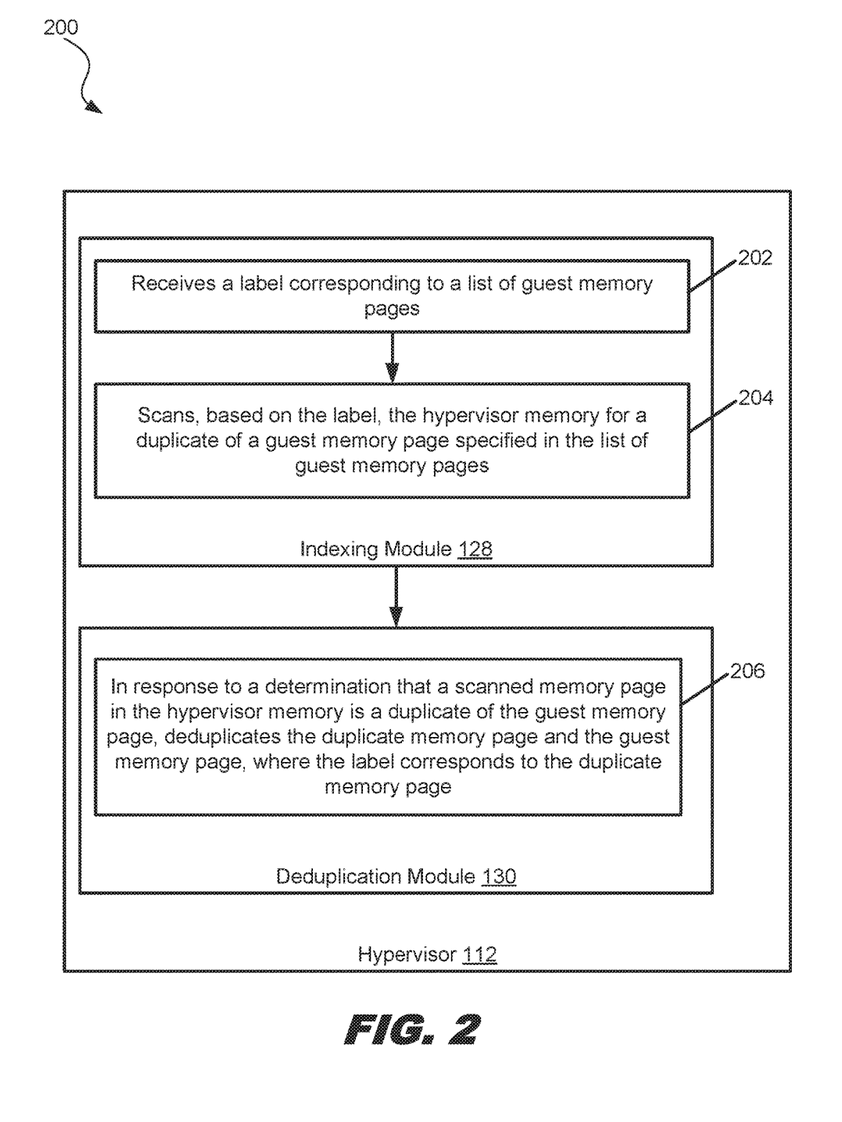
FIG. 2 is a block diagram illustrating a hypervisor, in accordance with various examples of the present disclosure.

FIG. 2 is a block diagram illustrating the hypervisor 112, in accordance with various examples of the present disclosure. The hypervisor 112 includes the indexing module 128 and the deduplication module 130, and is coupled to the hypervisor memory 132. A data structure and a plurality of memory pages included in the data structure correspond to the same label.

At action 202, the indexing module receives a label corresponding to a list of guest memory pages. A guest assigns the label to the list of guest memory pages, which is allocated to the guest. Memory pages that are assigned the same label have one or more commonalities. For example, the memory pages may be used by a shared library or allocated to virtual machines belonging to the same user. In some examples, the label indicates a content type stored in the list of guest memory pages, includes a cryptographic key that is assigned per-user and/or per-application, etc.

At action 204, the indexing module 128 scans, based on the label, the hypervisor memory 132 for a duplicate of a guest memory page specified in the list of guest memory pages. In some examples, the indexing module 128 receives one or more labels from one or more guests, where each received label corresponds to a list of guest memory pages from a guest. The indexing module 128 may scan the hypervisor memory 132 by identifying a data structure corresponding to the label and scanning the memory pages stored in the data structure for a duplicate of the guest memory pages specified in the list of guest memory pages.

At action 206, in response to a determination that a scanned memory page in the hypervisor memory 132 is a duplicate of the guest memory page, the deduplication module 130 deduplicates the duplicate memory page and the guest memory page, where the label corresponds to the duplicate memory page. The label may correspond to the duplicate memory page if the label was previously assigned by a guest (e.g., the guest kernel/operating system 118 or another guest) to the duplicate memory page. Accordingly, in order for the hypervisor 112 to deduplicate a memory page stored in the data structure and the guest memory page specified in the list of guest memory pages, the hypervisor 112 performs a check to make sure that the two memory pages are assigned the same label (and/or the same cryptographic key, if applicable).

Figure 3:
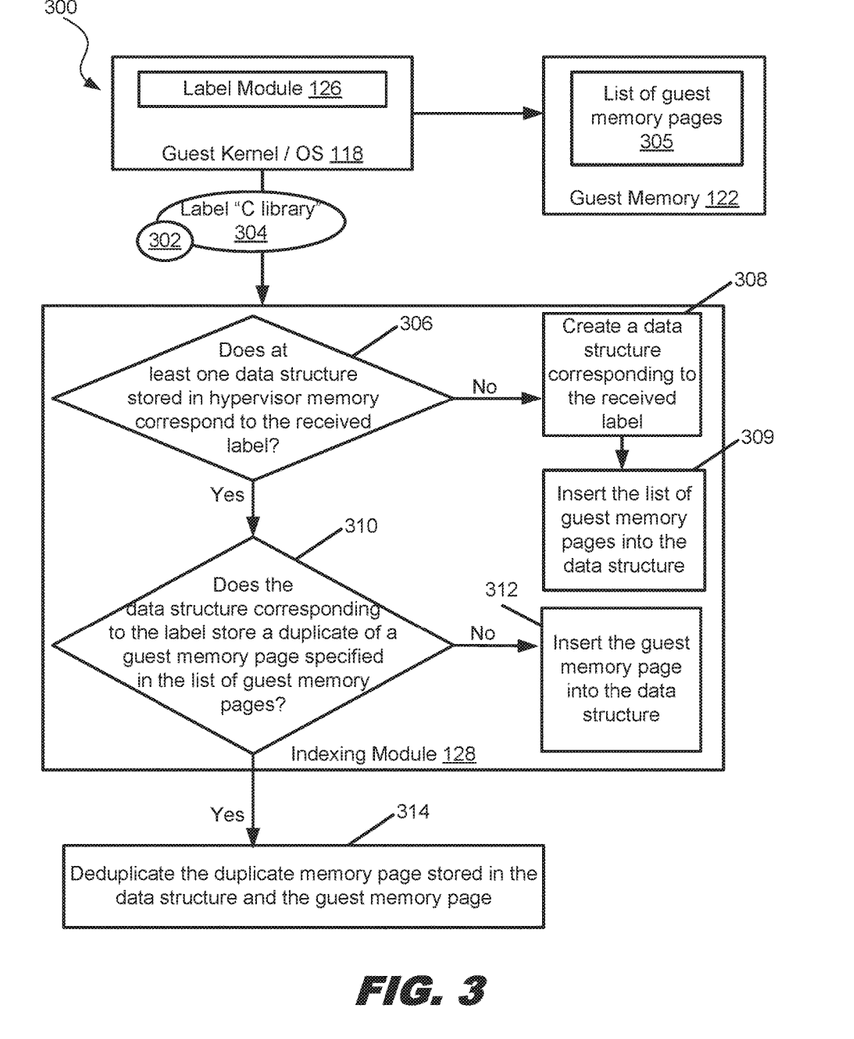
FIG. 3 is a diagram illustrating a process flow for initiating memory page deduplication based on a label corresponding to memory pages, in accordance with various examples of the present disclosure.

FIG. 3 is a diagram illustrating a process flow 300 for initiating memory page deduplication based on a label corresponding to memory pages. Method 300 is not meant to be limiting and may be used in other applications.

At action 302, the label module 126 sends a label "C library" 304 corresponding to a list of guest memory pages 305 to the hypervisor 112. The hypervisor 112 may assign the list of guest memory pages to the guest kernel/operating system 118, and the list of guest memory pages 305 is stored in guest memory 122. The label module 126 may assign the label to the list of guest memory pages, and the label may provide an indication of the content stored in the list of guest memory pages 305.

The indexing module 128 receives one or more labels from one or more guests and creates a data structure for each distinct label, and each label corresponds to memory pages allocated to the respective guest. In the example illustrated in FIG. 3, the indexing module 128 receives the label "C library" 304 corresponding to the list of guest memory pages 305 and scans, based on the label "C library" 304, the hypervisor memory 132 for a duplicate of one or more guest memory pages specified in the list of guest memory pages 305. In some examples, the guest kernel/operating system 118 loads the list of guest memory pages 305 into a memory address range and sends the memory address range to the indexing module 128. The indexing module 128 may receive the memory address range and compare one or more memory pages within the memory address range to the scanned hypervisor memory pages to search for duplicates of guest memory pages specified in the list of guest memory pages 305.

At action 306, the indexing module 128 determines whether at least one data structure stored in the hypervisor memory 132 corresponds to the received label "C library" 304. The hypervisor memory 132 may include a plurality of memory page and may store one or more data structures, each data structure corresponding to a label. In an example, the hypervisor 112 marks the data structure with the label. For example, the hypervisor 112 may mark a data structure with the label "Java library" and insert only those memory pages assigned the "Java library" label into this data structure. Similarly, the hypervisor 112 may mark a data structure with the label "Virtual Machine 116" and insert only those memory pages assigned the "Virtual Machine 116" label into this data structure. It may be unlikely that memory pages that store the Java library and/or that are used by the Java library are duplicates of memory pages that store the C library and/or that are used by the C library. By labeling memory pages in accordance with their corresponding shared libraries, it may be unnecessary to scan the memory pages corresponding to both these unrelated libraries to deduplicate memory pages, thus reducing the scan time. For example, if the list of guest memory pages 305 is assigned the "Java library" label, it may be unnecessary to scan memory pages stored in the data structure corresponding to the "Virtual Machine 116" label.

If the hypervisor memory 132 does not store a data structure that corresponds to the label "C library" 304, the process flow 300 proceeds from action 306 to action 308, in which the indexing module 128 creates a data structure corresponding to the label "C library" 304. The process flow 300 proceeds from action 308 to action 309, in which the indexing module 128 inserts the list of guest memory pages 305 into the data structure corresponding to the label.

In contrast, if the hypervisor memory 132 stores a data structure that corresponds to the label "C library" 304, the process flow 300 proceeds from action 306 to action 310, in which the indexing module 128 determines whether the data structure corresponding to the label stores a duplicate of a guest memory page specified in the list of guest memory pages 305. In an example, the data structure corresponding to the label stores a second list of memory pages in the hypervisor memory 132. In such an example, the hypervisor 112 may allocate one or more memory pages of the second list of memory pages to one or more guests, which may be the guest kernel/operating system 118 or another guest. In an example, the data structure may store memory pages that are allocated to a plurality of guests that run on the same or different virtual machines.

If the data structure corresponding to the label does not store a duplicate of the guest memory page specified in the list of guest memory pages 305, the process flow 300 proceeds from action 310 to action 312, in which the indexing module 128 inserts the guest memory page into the data structure corresponding to the label "C library" 304. In some examples, if each guest memory page of the list of guest memory pages 305 has not yet been analyzed (e.g., the indexing module 128 has not performed action 312 or action 315 on the guest memory page), the hypervisor 112 cycles through each of these memory pages of list of guest memory pages 305, and either deduplicates the analyzed guest memory page or inserts it into the data structure corresponding to the same label.

In contrast, if the data structure corresponding to the label stores a duplicate of the guest memory page specified in the list of guest memory pages 305, the process flow 300 proceeds from action 310 to action 314, in which the deduplication module 130 deduplicates the duplicate memory page stored in the data structure and the guest memory page. In an example, a first guest memory page specified in the list of guest memory pages 305 is allocated to the guest kernel/operating system 118. The guest kernel/operating system 118 may have a first set of page tables that references memory pages used by the guest kernel/operating system 118. The first set of page tables includes one or more page table entries, where a page table entry in the first set of page tables includes a mapping that references the first guest memory page in the guest kernel/operating system 118's address space. The deduplication module 130 may modify this mapping that references the guest memory page to reference its duplicate memory page in the data structure corresponding to the same label.

Additionally, the memory page stored in the data structure corresponding to the same label may be allocated to a second guest kernel/operating system (or to the guest kernel/operating system 118). The second guest kernel/operating system may have a second set of page tables that references memory pages used by the second guest kernel/operating system. The second set of page tables includes one or more page table entries, where a page table entry in the second set of page tables includes a mapping that references the duplicate memory page in the second guest kernel/operating system's address space. As discussed, the deduplication module 130 may modify one of these mappings such that the guest kernel/operating system 118's page table entry and the second guest kernel/operating system's page table entry reference either the first guest memory page or its duplicate memory page. The memory page that is referenced by both entries may be referred to as the deduplicated memory page, and the memory page that is no longer referenced may be discarded and freed to store other data. Additionally, the deduplication module 130 may mark the deduplicated memory page as copy-on-write such that if the guest kernel/operating system 118 or the second guest kernel/operating system attempts to modify this deduplicated memory page, the hypervisor 112 copies the deduplicated memory page, updates the mapping of the guest's page table entry to reference the copy, and allows the appropriate guest to write to the copy.

It is understood that additional processes may be performed before, during, or after actions 302, 306, 308, 310, 312, and/or 314 discussed above. It is also understood that one or more of the actions of the process flow 300 described herein may be omitted, combined, or performed in a different sequence as desired.

Figure 4:
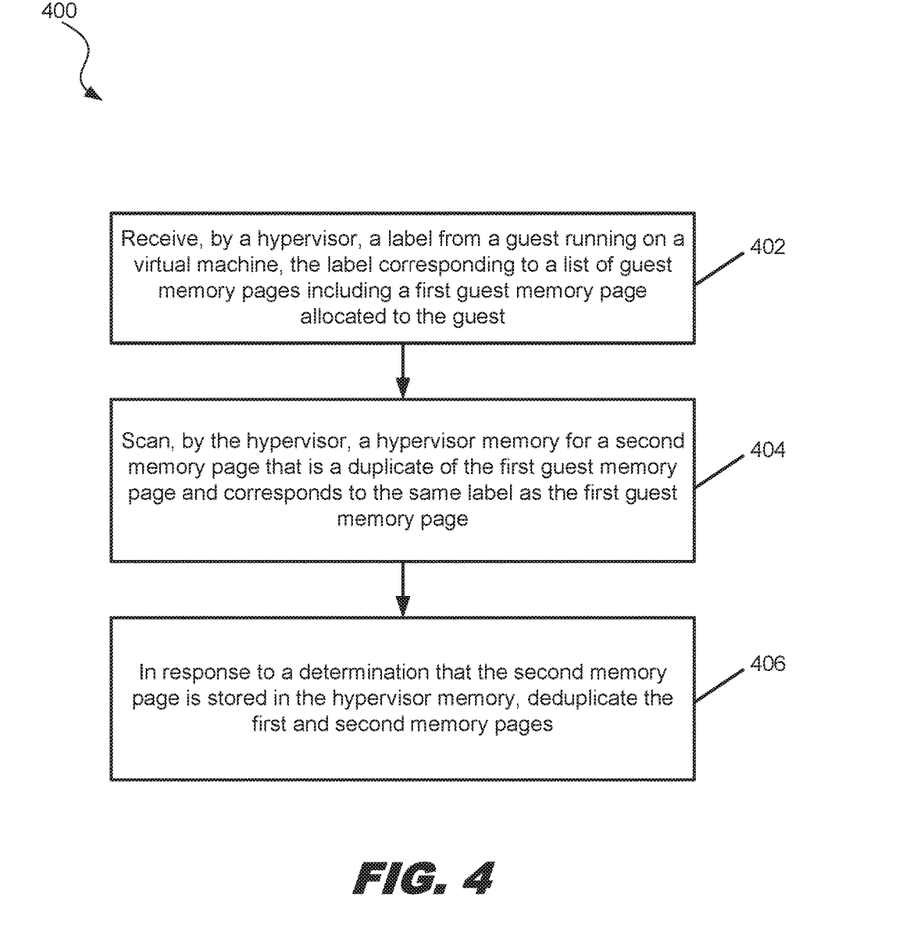
FIG. 4 is a diagram illustrating a method flow for initiating memory page deduplication based on a label corresponding to memory pages, in accordance with various examples of the present disclosure.

FIG. 4 is a diagram illustrating a method flow 400 for initiating memory page deduplication based on a label corresponding to memory pages, in accordance with various examples of the present disclosure. Method 400 is not meant to be limiting and may be used in other applications.

At action 402, the hypervisor 112 receives a label from the guest kernel/operating system 118 running on the virtual machine 116, the label corresponding to the list of guest memory pages 305 including a first guest memory page allocated to the guest kernel/operating system 118. At action 404, the hypervisor 112 scans the hypervisor memory 132 for a second memory page that is a duplicate of the first guest memory page and corresponds to the same label as the first guest memory page. Rather than scan all of the hypervisor memory 132 to search for a duplicate of the first guest memory page, the hypervisor 112 may narrow down the memory pages scanned in the hypervisor memory 132 by locating the data structure corresponding to the same label as the one corresponding to the list of guest memory pages 305. The hypervisor 112 may scan the memory pages stored in this located data structure (and not the others) for a duplicate of the first guest memory page. At action 406, in response to a determination that the second memory page is stored in the hypervisor memory 132, the hypervisor 112 deduplicates the first and second memory pages.

It is understood that additional processes may be performed before, during, or after actions 402-406 discussed above. It is also understood that one or more of the method 400 described herein may be omitted, combined, or performed in a different sequence as desired. For example, in response to a determination that the second memory page is not stored in the hypervisor memory 132, the hypervisor 112 inserts the first guest memory page into the data structure.

Figure 5:
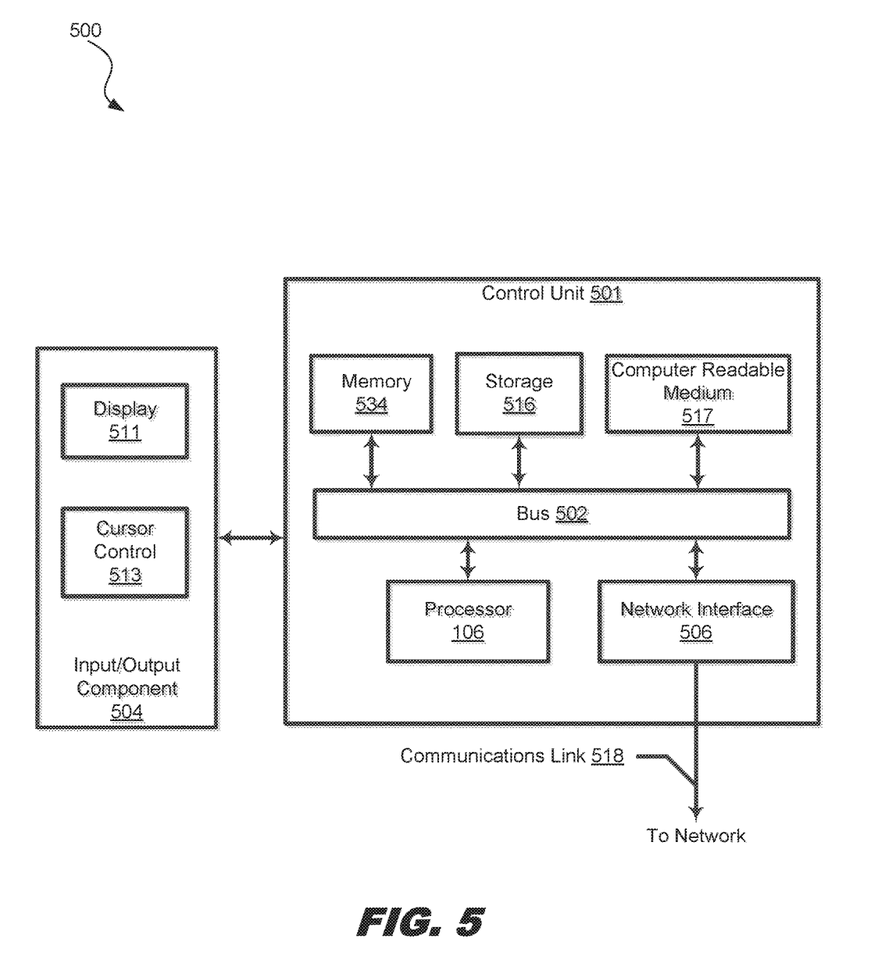
FIG. 5 is a block diagram of an electronic system suitable for implementing one or more examples of the present disclosure.

FIG. 5 is a block diagram of a computer system 500 suitable for implementing one or more examples of the present disclosure. In various implementations, computer system 500 corresponds to host machine 102, which may include a client or a server computing device. The client or server computing device may include a plurality of processors. The client or server computing device may additionally include one or more storage devices each selected from a group including floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read. The one or more storage devices may include stored information that may be made available to one or more computing devices and/or computer programs (e.g., clients) coupled to the client or server using a computer network (not shown). The computer network may be any type of network including a LAN, a WAN, an intranet, the Internet, a cloud, and/or any combination of networks thereof that is capable of interconnecting computing devices and/or computer programs in the system.

Computer system 500 includes a bus 502 or other communication mechanism for communicating information data, signals, and information between various components of computer system 500. Components include an input/output (I/O) component 504 that processes a user action, such as selecting keys from a keypad/keyboard, selecting one or more buttons or links, etc., and sends a corresponding signal to bus 502. In an example, a user may interact with a host computing system using I/O component 504 and cause virtual machine 116 to launch. In this example, the hypervisor may provide for deduplication and share identical memory pages among the different processes and/or virtualized guests. I/O component 504 may also include an output component such as a display 511, and an input control such as a cursor control 513 (such as a keyboard, keypad, mouse, etc.).

A transceiver or network interface 506 transmits and receives signals between computer system 500 and other devices via a communications link 518 to a network. In an examples, the transmission is wireless, although other transmission mediums and methods may also be suitable. The processor 106, which may be a micro-controller, digital signal processor (DSP), or other processing component, processes these various signals, such as for display on computer system 500 or transmission to other devices via communications link 518. The processor 106 may also control transmission of information, such as cookies or IP addresses, to other devices.

Components of computer system 500 also include a system memory component 534 (e.g., RAM), a static storage component 516 (e.g., ROM), and/or a disk drive 517. System memory component 534 may include memory 534. Computer system 500 performs specific operations by processor 106 and other components by executing one or more sequences of instructions contained in system memory component 534. Logic may be encoded in a computer readable medium, which may refer to any medium that participates in providing instructions to processor 106 for execution. Such a medium may take many forms, including but not limited to, non-volatile media, volatile media, and transmission media.

In various implementations, non-volatile media includes optical, or magnetic disks, or solid-state drives, volatile media includes dynamic memory, such as system memory component 534, and transmission media includes coaxial cables, copper wire, and fiber optics, including wires that include bus 502. In an example, the logic is encoded in non-transitory computer readable medium. In an example, transmission media may take the form of acoustic or light waves, such as those generated during radio wave, optical, and infrared data communications. Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EEPROM, FLASH-EEPROM, any other memory chip or cartridge, or any other medium from which a computer is adapted to read.

In various examples, execution of instruction sequences (e.g., flow 200, flow 300, and/or flow 400) to practice the present disclosure may be performed by computer system 500. In various other examples, a plurality of computer systems 500 coupled by communication links 518 to the network (e.g., such as a LAN, WLAN, PTSN, and/or various other wired or wireless networks, including telecommunications, mobile, and cellular phone networks) may perform instruction sequences to practice the present disclosure in coordination with one another.

Where applicable, various examples provided by the present disclosure may be implemented using hardware, software, or combinations of hardware and software. Also where applicable, the various hardware components and/or software components set forth herein may be combined into composite components including software, hardware, and/or both without departing from the spirit of the present disclosure. Where applicable, the various hardware components and/or software components set forth herein may be separated into sub-components including software, hardware, or both without departing from the spirit of the present disclosure. In addition, where applicable, it is contemplated that software components may be implemented as hardware components, and vice-versa.

Application software in accordance with the present disclosure may be stored on one or more computer readable mediums. It is also contemplated that the application software identified herein may be implemented using one or more general purpose or specific purpose computers and/or computer systems, networked and/or otherwise. Where applicable, the ordering of various steps or actions described herein may be changed, combined into composite steps or composite actions, and/or separated into sub-steps or sub-actions to provide features described herein.

The foregoing disclosure is not intended to limit the present disclosure to the precise forms or particular fields of use disclosed. As such, it is contemplated that various alternate examples and/or modifications to the present disclosure, whether explicitly described or implied herein, are possible in light of the disclosure. Changes may be made in form and detail without departing from the scope of the present disclosure. Thus, the present disclosure is limited only by the claims.

What is claimed is:

1. A system for deduplicating one or more memory pages, comprising:
    a guest that assigns a label to a list of guest memory pages and runs on a virtual machine;
    a hypervisor memory that stores one or more data structures, wherein each data structure stores one or more memory pages; and
    a hypervisor including an indexing module and a deduplication module and coupled to the hypervisor memory, wherein the indexing module receives one or more labels from one or more guests, creates a data structure for each distinct label, and scans, based on a received label, a data structure corresponding to the received label for a duplicate of a guest memory page specified in the list of guest memory pages; and
    a deduplication module that in response to a determination that a scanned memory page is a duplicate of the guest memory page, deduplicates the duplicate memory page and the guest memory page.

2. The system of claim 1, further including:
    wherein the hypervisor allocates the list of guest memory pages to the guest.

3. The system of claim 1, wherein the guest loads the list of guest memory pages into a memory address range and sends the memory address range to the hypervisor.

4. The system of claim 3, wherein the indexing module receives the memory address range and compares one or more memory pages within the memory address range to the scanned hypervisor memory pages to search for duplicates of the guest memory page.

5. The system of claim 1, wherein the indexing module determines whether the data structure corresponds to the label, wherein each label corresponds to memory pages allocated to the respective guest, and wherein in response to a determination that the data structure corresponds to the label, the indexing module scans the memory pages stored in the data structure for a duplicate of the guest memory page.

6. The system of claim 5, wherein in response to a determination that no data structures correspond to the label, the indexing module creates the data structure corresponding to the label and inserts the list of guest memory pages into the data structure corresponding to the label.

7. The system of claim 5, wherein in response to a determination that the data structure corresponds to the label, the indexing module determines whether the data structure stores a duplicate of the guest memory page, and wherein in response to a determination that the data structure does not store a duplicate of the guest memory page, the indexing module inserts the guest memory page into the data structure.

8. The system of claim 5, wherein the data structure stores a second list of memory pages, and the hypervisor allocates one or more memory pages of the second list of guest memory pages to a second guest different from the first guest.

9. The system of claim 1, wherein the label indicates a content type stored in the list of guest memory pages.

10. The system of claim 1, wherein the label includes a cryptographic key.

11. The system of claim 10, wherein the cryptographic key is assigned per-user.

12. The system of claim 10, wherein the cryptographic key is assigned per-application.

13. The system of claim 1, wherein the label resides in multiple bytes that occupy consecutive memory addresses.

14. A method of deduplicating one or more memory pages, comprising:
receiving, by a hypervisor, one or more labels from a guest running on a virtual machine, each label corresponding to a particular list of guest memory pages allocated to the guest;
creating, by the hypervisor, a data structure for each distinct label;
scanning, by the hypervisor, a hypervisor memory for a first memory page that is a duplicate of a guest memory page specified in a list of guest memory pages, wherein the first memory page corresponds to the same label as the guest memory page and is stored in a data structure in the hypervisor memory; and
in response to a determination that the first memory page is stored in the hypervisor memory, deduplicating the first memory page and the guest memory page.

15. The method of claim 14, further comprising:
determining whether at least one data structure in the hypervisor memory corresponds to the label from the guest, wherein scanning the hypervisor memory includes in response to a determination that the data structure corresponds to the label from the guest, scanning the memory pages stored in the data structure for the first memory page.

16. The method of claim 15, further comprising:
in response to a determination that no data structures correspond to the label:
creating the data structure corresponding to the label; and
inserting the list of guest memory pages into the data structure.

17. The method of claim 15, further comprising:
in response to a determination that the data structure does not store the first memory page, inserting, by the hypervisor, the guest memory page into the data structure.

18. The method of claim 15, further comprising:
marking, by the hypervisor, the data structure with the label.

19. A non-transitory machine-readable medium comprising a plurality of machine-readable instructions that when executed by one or more processors is adapted to cause the one or more processors to perform a method comprising:
receiving, by a hypervisor, one or more labels from a guest running on a virtual machine, each label corresponding to a particular list of guest memory pages allocated to the guest;
creating, by the hypervisor, a data structure for each distinct label;
scanning, by the hypervisor, a hypervisor memory for a first memory page that is a duplicate of a guest memory page specified in a list of guest memory pages, wherein the first memory page corresponds to the same label as the guest memory page and is stored in a data structure in the hypervisor memory; and
in response to a determination that the first memory page is stored in the hypervisor memory, deduplicating the first memory page and the guest memory page.

20. The system of claim 1, wherein the label corresponds to the duplicate memory page.

* * * * *